US008108798B2

(12) United States Patent
Sauermann

(10) Patent No.: US 8,108,798 B2
(45) Date of Patent: Jan. 31, 2012

(54) METHOD AND SYSTEM FOR IMPLEMENTING ENHANCED BUTTONS IN A GRAPHICAL USER INTERFACE

(75) Inventor: Volker Sauermann, Dossenheim (DE)

(73) Assignee: SAP AG, Walldorf (DE)

( * ) Notice: Subject to any disclaimer, the term of this patent is extended or adjusted under 35 U.S.C. 154(b) by 790 days.

(21) Appl. No.: 11/026,247

(22) Filed: Dec. 29, 2004

(65) Prior Publication Data

US 2006/0143575 A1     Jun. 29, 2006

(51) Int. Cl.
    *G06F 3/048* (2006.01)
(52) U.S. Cl. ......... 715/840; 715/765; 715/766; 715/809
(58) Field of Classification Search .................. 715/840, 715/517, 710, 708, 808, 811, 835, 765, 767, 715/809, 772, 766
    See application file for complete search history.

(56) References Cited

U.S. PATENT DOCUMENTS

| | | | | |
|---|---|---|---|---|
| 5,601,432 A * | 2/1997 | Bergman | | 434/118 |
| 5,736,984 A * | 4/1998 | Jellinek et al. | | 715/710 |
| 5,860,067 A * | 1/1999 | Onda et al. | | 705/9 |
| 6,067,568 A * | 5/2000 | Li et al. | | 709/223 |
| 6,292,273 B1 * | 9/2001 | Dow et al. | | 358/473 |
| 6,340,967 B1 * | 1/2002 | Maxted | | 345/179 |
| 6,907,580 B2 * | 6/2005 | Michelman et al. | | 715/856 |
| 6,971,068 B2 * | 11/2005 | Bates et al. | | 715/788 |
| 6,993,707 B2 * | 1/2006 | Baker et al. | | 715/241 |
| 7,197,555 B1 * | 3/2007 | Sheikh | | 709/224 |
| 2004/0236574 A1 * | 11/2004 | Ativanichayaphong et al. | | 704/231 |
| 2005/0166148 A1 * | 7/2005 | Garding | | 715/708 |
| 2005/0257167 A1 * | 11/2005 | Fraleigh et al. | | 715/809 |
| 2006/0010397 A1 * | 1/2006 | Laffey | | 715/808 |
| 2006/0020889 A1 * | 1/2006 | Coppinger et al. | | 715/710 |

* cited by examiner

*Primary Examiner* — Namitha Pillai
(74) *Attorney, Agent, or Firm* — Kenyon & Kenyon LLP

(57) ABSTRACT

A method and system are provided for implementing enhanced buttons in graphical user interface of a software application running on computer system. The enhanced buttons allow additional options to be presented to the user in a context-sensitive manner in the same graphical user interface screen that the user is interacting with. The enhanced buttons are context-sensitive buttons that appear on a graphical user interface window as a result of an initiating action or operation selected from the screen. The initiating operation may be linked to a field, button, or other graphical element or object on the screen and the context-sensitive buttons are associated with this linked graphical element. The context-sensitive buttons may be displayed on the graphical user interface screen in relation to the associated graphical element.

20 Claims, 7 Drawing Sheets

METHOD AND SYSTEM FOR IMPLEMENTING ENHANCED BUTTONS IN A GRAPHICAL USER INTERFACE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a method and system for implementing enhanced buttons in a graphical user interface viewable on a computer system display.

In one embodiment, the present invention particularly relates to the replacement of confirmation pop-ups with enhanced context-sensitive buttons.

BACKGROUND

Software applications running on computer systems implement graphical user interfaces to facilitate the man-machine interface by making the software easier to use. One particular aspect of a graphical user interface (GUI) is the use of buttons, which are graphical elements or objects displayed to the user that can be "clicked" on with a pointing device (e.g., a mouse) or otherwise selected in order to initiate an action. Often the action or operation initiated by selecting a button or making a selection from a pull-down menu results in the additional display of information or requires user interaction outside the window or screen in which the initiating action or operation commenced. For example, clicking on a "Delete" button in a window of a software GUI may result in a popup window being displayed requesting the user confirm or cancel the delete operation. Though these popup windows may serve a useful purpose, they also obscure the underlying data and cause the user to move a pointing device to the window or otherwise select options on the popup window to complete the operation. Another problem is that a popup window may lose focus and be displayed behind the initiating screen cause further hindrance to the user especially if the initiating window becomes inactive until the popup window interaction is complete.

One example of a graphical user interface is the user interface for a search engine administration software application. FIG. 1 is a diagram illustrating a conventional graphical user interface for a search engine administration software tool. The search engine consists of several servers, such as queue servers, index servers, preprocessors, and name servers, running in a distributed environment. New documents are passed to the search engine from a queue in the queue server. The queue server first passes the documents to a preprocessor for preprocessing. The queue server then transfers the documents to an index server where they are indexed and optimized, after which they become visible in a new or already existing index. After the documents are included in an index, they can then be searched.

The graphical user interface 100 for the search engine administration software application may present information in a table view format using tabs 101 to separate functions. In the example shown in FIG. 1, the Queue Administration tab 102 is the selected function. Within the Queue Administration tab 102 a number of operations are made available to the user through on-screen buttons 103. These buttons may initiate operations such as flushing the selected queues 110 in the Queue Info tab 104 (associated with the "Flush" button 106), suspend the selected queues 110 (associated with the "Suspend" button 107), activate the selected queues ("Activate" button 108), etc.

When a user selects a button 103 on the screen, a popup window may appear with a confirmation request to determine if the user really wants to execute the initiating operation (the selected operation and/or button initiating the confirmation popup window). FIG. 2 is a diagram illustrating a conventional popup confirmation window for a delete operation. In the example shown in FIG. 2, a user clicking on a "Delete" button 109 causes a popup window 210 to be displayed asking the user 211 to confirm that he/she indeed wants to delete the selected queues 110. The popup window 210 contains two buttons "OK" 212 and "Cancel" 213 allowing the user to choose one of those options. In order to respond to the popup window, the user is forced to move the cursor a considerable distance from the Delete button 109 to either the OK button 212 or the Cancel button 213. Even though users may be used to moving the cursor to popup windows in conventional software application GUIs, improvements to this system are desirable methods of improving the man-machine interface. Alternatively, the user may also use the "Enter", "Return", or "↵" keys (not shown) in conjunction with the "Tab" key (not shown) to selected the highlighted popup window button. This requires the user to move from the mouse or other pointing device to a keyboard and is also cumbersome. Additionally, the popup window may obscure the underlying data which may be needed by the user to make the confirmation in the popup window. The present invention overcomes these problems through a novel method of enhanced context-sensitive buttons.

DETAILED DESCRIPTION

Figure 1:
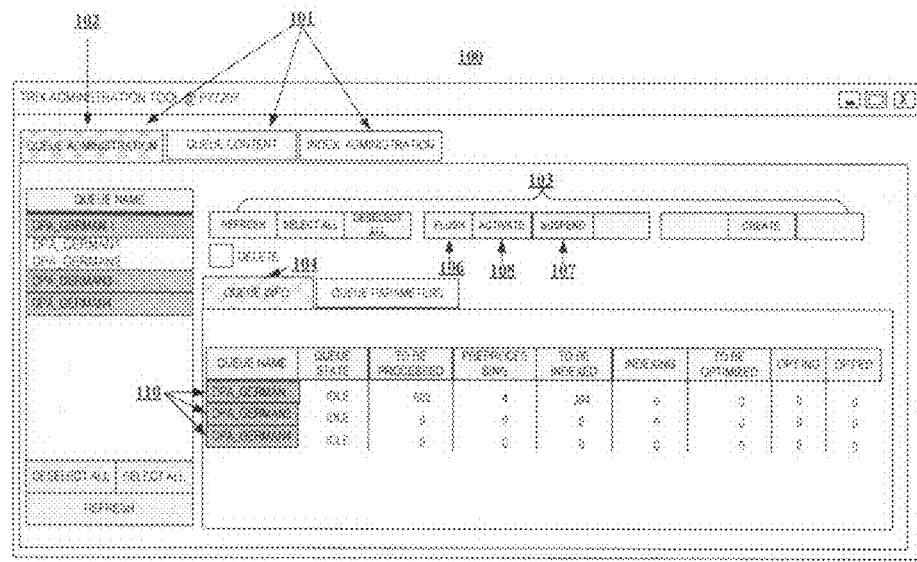
FIG. 1 is a diagram illustrating a conventional graphical user interface for a search engine administration software tool.
Figure 2:
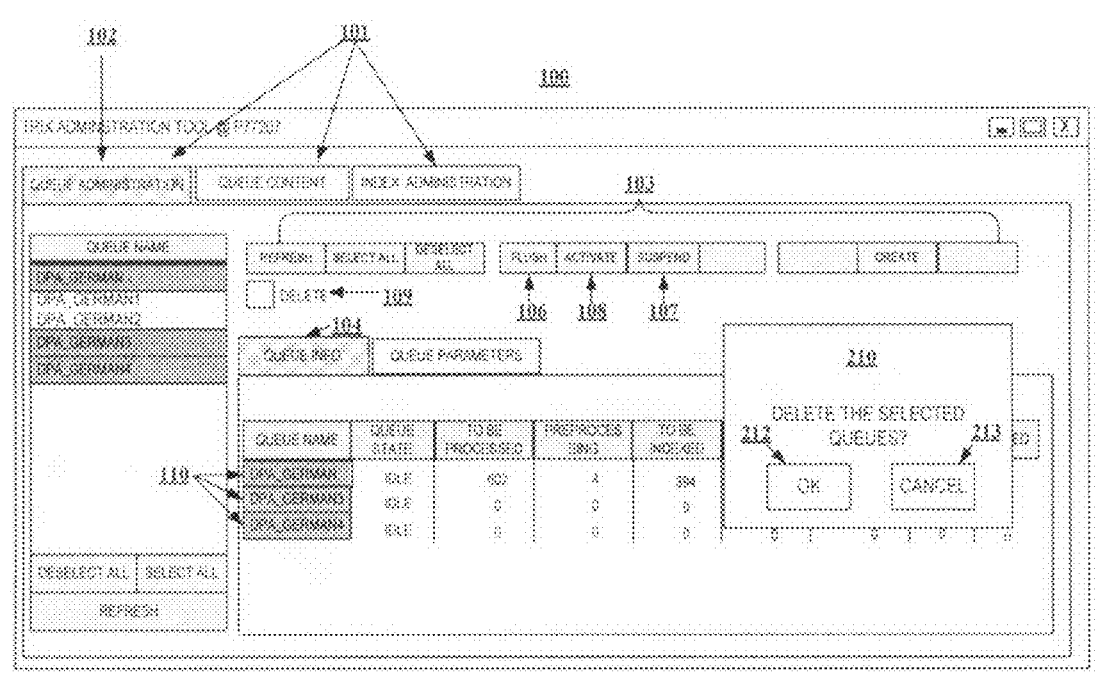
FIG. 2 is a diagram illustrating a conventional popup confirmation window for a delete operation.

A method and system are provided for implementing enhanced buttons in a graphical user interface of a software application running on computer system. The enhanced buttons allow additional options to be presented to the user in a context-sensitive manner in the same graphical user interface window that the user is interacting with. The enhanced buttons are context-sensitive buttons that appear on a graphical user interface window as a result of an initiating action or operation selected from the screen (screen and window are used interchangeably herein). The initiating operation may be linked to a field, button, or other graphical element or object on the screen and the context-sensitive buttons are associated with this linked graphical element. The context-sensitive buttons may be displayed on the graphical user interface screen in relation to the associated graphical element.

According to one embodiment of the present invention, a method and system for implementing enhanced buttons in a graphical user interface (GUI) are provided for software running on a processor and being displayed to a user. The enhanced buttons allow a user action on a window of a graphical user interface to initiate the display of context-sensitive buttons either facilitating further interaction between the user and the software application or presenting the user further options on the same screen as the initiating action. For example, the context-sensitive enhanced buttons may allow the incorporation of confirmation requests on the same screen from which the initiating operation is commenced. The context-sensitive enhanced buttons may allow the incorporation of options directly onto the GUI screen rather than using popup windows or other means that can obscure the underlying data. Additionally, the context-sensitive enhanced buttons may appear on the screen near an associated object such as the initiating button or near an associated data field.

The enhanced buttons represent additional options that may be presented to user in a context-sensitive manner. For example, the enhanced buttons may represent the reduction of a popup window to its essential selection elements (buttons) that are directly incorporated into the current display rather than being displayed in a popup format. In this example, the popup buttons may appear in the same window as the initiating button (not in a separate popup window). The enhanced buttons allow additional options to be presented to a user when the user selects an operation from the graphical user interface. These additional options may cover a broad spectrum of functions including, for example, a confirmation request prompting the user whether to continue or abort the selected operation.

The enhanced button option may be triggered in a number of ways including, for example, by clicking on an initiating button on a screen in the graphical user interface display. For example if the user selects (e.g., clicks on or tabs to and enters) the Delete button on a GUI screen, the Delete button may be an initiating button (the Delete operation being the initiating operation) initiating the display of subordinate confirmation buttons (e.g., OK and Cancel) on the same GUI screen. The combination of the initiating button and subordinate buttons triggered by the initiating button is used in this embodiment of the present invention. The display of subordinate buttons may be initiated in other ways rather than through the selection of an initiating button. Using the Delete button as an example, subordinate confirmation buttons (OK and Cancel) may be displayed adjacent to the Delete button even if the operation is triggered by the user pressing the Delete or Del key on the keyboard or other input device of a computer system. Selecting a button on the GUI screen is only one possible initiating method according to the embodiments below.

The number of subordinate buttons that are displayed when triggered by an operation on the GUI may depend on the context of the operation according to one embodiment of the present invention. A confirmation request incorporated into subordinate buttons may typically include two buttons as there are generally two options: continue and abort. In other contexts, the number of subordinate buttons may be specific to the operation. An operation on the GUI may trigger subordinate buttons requesting additional information from the user. In this example context, the number of subordinate buttons may depend on the amount or options for the requested information that are presented to the user.

The placement of the subordinate buttons may also be based on the context of the operation according to one embodiment of the present invention. Subordinate buttons for a confirmation request may be placed adjacent to the initiating or associated (linked) button. For example, a user selecting the Delete button on a GUI screen may initiate subordinate confirmation buttons that may displayed adjacent to (e.g., above, below, to one side, etc.) the initiating Delete button. This may also occur even if the delete operation is triggered by other means such as the user selecting "delete" from a pull-down menu or by selecting the delete key on an input device. In this situation, the association between the Delete button and the delete operation may determine the placement of the subordinate buttons. In another example, a user selecting a "Verify" button on a GUI screen may initiate subordinate "Modify", "Delete", and/or "Clear" buttons that appear next to the data on the screen being verified instead of next to the initiating "Verify" button.

Figure 3:
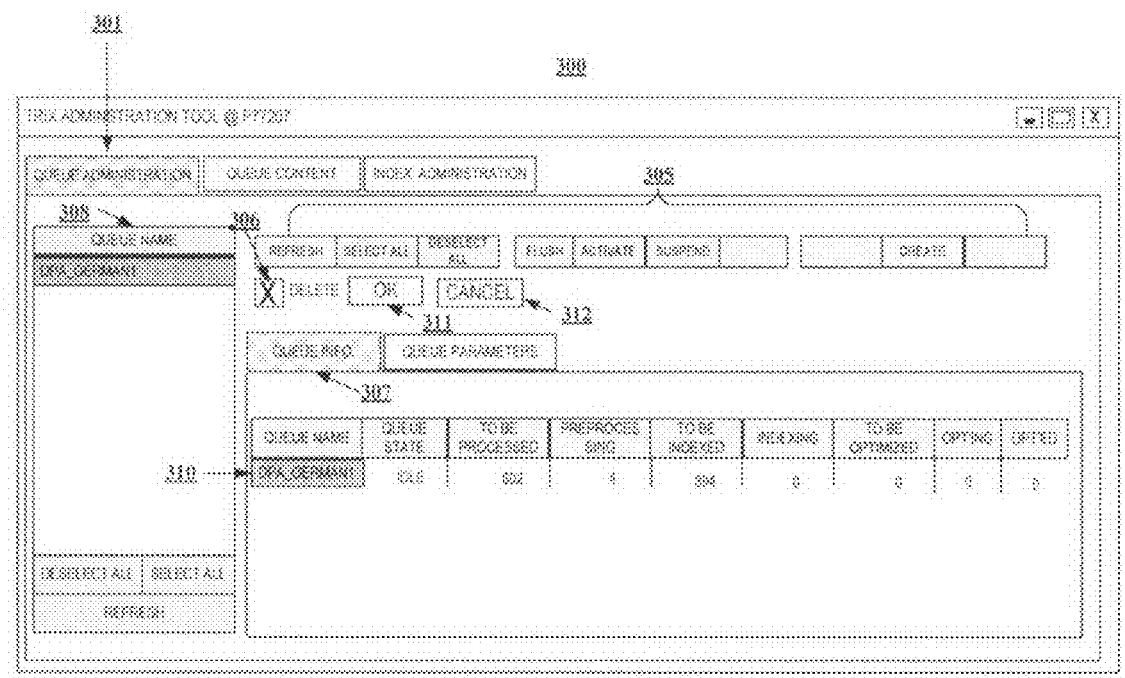
FIG. 3 is a diagram illustrating the implementation of enhanced buttons in the context of confirming a user action according to one embodiment of the present invention.

FIG. 3 is a diagram illustrating the implementation of enhanced buttons in the context of confirming a user action according to one embodiment of the present invention. The graphical user interface screen 300 shown is the Queue Administration tab 301 data screen of a search engine administration tool and includes several buttons 305. One button provided on the Queue Administration screen 301 of the program is a "Delete" button 306. In FIG. 3, the Delete button 306 as shown initiates the deletion of one or more queues 307 in the "Queue Info" tab 308 within the Queue Administration tab 301 of the screen 300. In the example depicted in FIG. 3, the queue identified by queue name "dpa$_{13}$german1" 310 is highlighted and will be deleted when the user clicks on or otherwise selects the Delete button 306. In order to avoid the unintended deletion of data, conventional software applications typically request a user confirmation that they indeed intend to delete the identified information. Instead of using conventional means for requesting this confirmation such as using a pop-up window, the embodiment of the present invention illustrated in FIG. 3 uses enhanced buttons. The Delete button 306 once clicked results in an alteration of the button text to indicate a question "Delete?" as well as the display of two subordinate buttons 311, 312 linked to the Delete button 306 according to this embodiment. These additional buttons 311, 312 are subordinate to the Delete button 306 in that they are displayed in response to the clicking on the Delete button 306 to initiate a deletion operation. The two subordinate buttons 311, 312 contain the options that are conventionally displayed by other means such as through a popup window. For example, the first subordinate button 311 "OK" allows the user to positively confirm that they want to execute or otherwise commence with the action associated with the initiating Delete button 306. The second button 312 "Cancel" allows the user to indicate that they do not want to execute or otherwise continue with the action associated with the initiating Delete button 306. The button text "OK" and "Cancel" as shown in the example embodiment in FIG. 3 are only one possibility for a confirmation. Other examples of button text for a positive confirmation in addition to "OK" may include, among others, "Yes", "Go", and "Continue". Other examples of button text for a negative confirmation (i.e., indicating that the user does not want to proceed with the action) in addition to "Cancel" may include, among others, "No", "Back", and "Abort". The subordinate buttons 311, 312 shown in FIG. 3 do not use text such as "Delete selected Queue(s)?", "Do you really want to delete?", "Do you want to continue?", etc. that are commonly displayed in conventional popup windows. This conventional text is redundant because an average user implicitly understands the outcome of selecting the OK button 311 and/or the Cancel 312 button in the context in which they appear.

When the user clicks on the initiating button ("Delete" 306 in the example shown in FIG. 3), the subordinate buttons 311, 312 may directly appear (i.e., in an immediate manner without animation and/or effect) on the display to the user or they may appear using some animation and/or effect according to one embodiment of the present invention. For example, the subordinate buttons 311, 312 may appear (move in) from behind the initiating button 306. In another example, the subordinate buttons 311, 312 may gradually appear (fade in) onto the display (i.e., progressively appear from a faint outline until fully present). Any animation and/or effect may be used to display the subordinate buttons 311, 312 when their appearance is triggered by clicking on the initiating button 306. For example when a user clicks on the Delete button 306, the two subordinate buttons OK 311 and Cancel 312 may vertically scroll down from behind the Delete button 306 (i.e., appear as if they are being pulled down from behind the initiating button). The animation and/or effect used when the subordinate buttons 311, 312 appear on the display may be the same or different from the animation and/or effect used when the subordinate buttons 311, 312 disappear from the display. If an animation and/or effect is used when the subordinate buttons 311, 312 appear, an animation and/or effect may or may not be used when the subordinate buttons 311, 312 disappear—the use of an animation and/or effect when the subordinate button appears does not require an animation and/or effect when the subordinate button disappears. The animation and/or effect used when a subordinate button appears may also be different for each of the subordinate buttons. For example, the OK button 311 may horizontally scroll down while the Cancel button 312 fades in. A subordinate button may also incorporate an animation and/or effect when it appears or disappears independent of whether or not other subordinate buttons do so. For example when a user clicks on the Delete button 306, the OK button 311 may horizontally scroll down independent of whether the Cancel button incorporates an animation and/or effect when it appears.

The remainder of the graphical user interface other than the subordinate buttons may become inactive in one embodiment of the present invention when the subordinates buttons appear until the user clicks on one of the subordinate buttons to execute the associated action. For example using the subordinate buttons for a confirmation of a user action may cause the other parts of the GUI for the software application to become inactive until the user confirms or cancels the associated initiating action. In the example shown in FIG. 3, a user clicking on the Delete button 306 may initiate the appearance of the associated (linked) subordinate buttons OK 311 and Cancel 312 with the GUI becoming inactive until either the OK 311 or Cancel 312 buttons are clicked on or otherwise selected by the user. In an alternative embodiment, the GUI may remain active with any user action other than clicking on or otherwise selecting the subordinate buttons causing the initiating action to be cancelled. Both embodiments are discussed later in this specification.

The presentation of the subordinate buttons may also distinguish them from the remainder of the graphical user interface according to one embodiment of the present invention. Using a different presentation format may draw the user's attention to the subordinate buttons which may be particularly desirable if the GUI otherwise remains inactive until one of the subordinate buttons is selected (e.g., by clicking on it). The presentation of the subordinate buttons may include for example specific colors, font characteristics, graphical elements, and/or graphical effects. In the embodiment depicted in FIG. 3, the graphical user interface 300 is a standard gray color but the subordinate buttons 311, 312 use bright colors (not shown) to draw user attention to them. The OK button 311 is green (not apparent in FIG. 3) to indicate that selecting it proceeds with the initiating operation (i.e., the Delete operation) in a similar manner as a green light indicates that a car may proceed at an intersection. The Cancel button 312 is red (not apparent in FIG. 3) to indicate that selecting it halts or stops the initiating operation (i.e., the Delete operation) in a similar manner as a red light indicates that a car must halt or stop at an intersection. Font characteristics (not shown) may also be used to differentiate the subordinate buttons. Font characteristics may include the use of different fonts, font sizes, bolding, italicizing, etc. Graphical elements may include the use of imagery, shapes, etc. to present the subordinate buttons. Graphical effects may include animations, blinking, or other graphical effect used in displaying the subordinate buttons to the user. Any individual or combination of presentation formats may be used in displaying the subordinate buttons. The presentation format(s) used to display a subordinate button may be independent of the presentation format(s) used to display any other subordinate buttons. Therefore, the use of a presentation format in one subordinate button does not necessarily result in the use of any presentation format in other subordinate buttons.

When the user clicks on a subordinate button ("OK" 311 and "Cancel" 312 in the example shown in FIG. 3), the subordinate buttons may immediately (i.e., in a direct manner) disappear from the display or they may disappear using some animation and/or effect according to one embodiment of the present invention. The animation and/or effect used when the subordinate buttons 311, 312 disappear from the display may be either the same or different from the animation and/or effect used to display the subordinate buttons 311, 312 when they appear. For example, the subordinate buttons may vertically scroll down from behind the initiating button when they appear but they may dissolve (i.e., fade away) when they disappear. An animation and/or effect may be used when a subordinate button disappears even if an animation and/or effect is not used when the button first appeared. The animation and/or effect used when the subordinate buttons 311, 312 disappear may also be the same or different for each of the subordinate buttons. For example, when a user clicks on the OK button 311, the Cancel button 312 may immediately disappear (no animation and/or effect) while the OK button 311 dissolves from the screen (i.e., the OK button 311 gradually fades away from the display). In addition, the use of an animation and/or effect when a subordinate button disappears is independent of the use of animation and/or effect in other subordinate buttons. This difference in removing the buttons from the display may serve a functional purpose. In the example above, allowing the user additional time to see the option chosen may be a functional purpose attained by more gradually dissolving the chosen (clicked on) subordinate button rather than immediately removing the subordinate button not chosen. As previously described in one embodiment, the rest of the graphical user interface may become inactive until the user clicks on one of the options provided in the subordinate buttons (i.e., the user clicks on one of the subordinate buttons). In this case, clicking on another part of the GUI will have no effect and, therefore, no action regarding the subordinate buttons occurs until one of the buttons is selected (e.g., clicked on). In an alternative embodiment the rest of the graphical user interface may remain active even though the subordinate buttons are displayed to the user. In this case, clicking elsewhere on the graphical user interface other than on the subordinate buttons may initiate a default action such as canceling the originally initiated operation. For example if the user selects a queue 310 from the Queue Info 308 tab area of the GUI and clicks on the Delete button 306, the subordinate buttons OK 311 and Cancel 312 are displayed but the remainder of the GUI still remains active in this alternative embodiment. If the user then does not click on any of the subordinate buttons but instead clicks on the "Select All" button 313, the subordinate buttons 311, 312 may disappear from the display (with the initiating operation being cancelled) and the GUI initiates the action linked to the Select All button 313. In another embodiment of the present invention, the subordinate buttons may remain on the screen for a certain amount of time after which they will disappear with the initiating operation being cancelled if the user does not click on any of the subordinate buttons. This embodiment may work with both variations where the GUI is inactive during the display of the subordinate buttons and when the GUI remains active during the display of the subordinate buttons.

Figure 4:
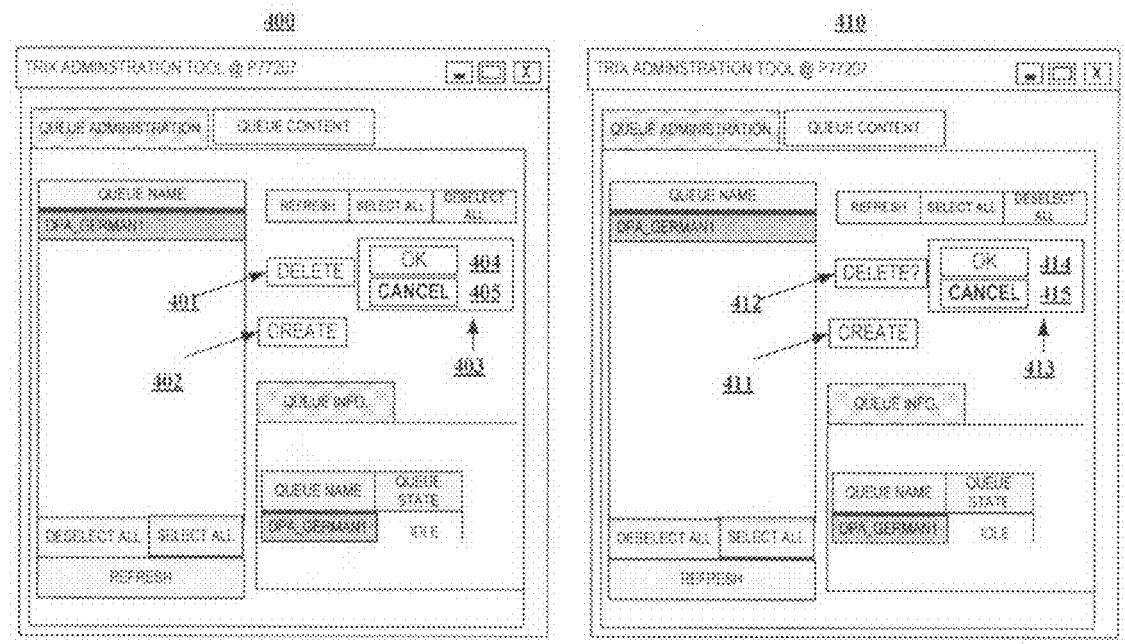
FIG. 4 is a diagram illustrating two different presentations of subordinate confirmation buttons according to one embodiment of the present invention.

FIG. 4 is a diagram illustrating two different presentations of subordinate confirmation buttons according to one embodiment of the present invention. The subordinate buttons shown in the first presentation 400 include a "Create" button 401, a "Delete" button 402 and two subordinate buttons for the Delete button 402: the "OK" button 404 and the "Cancel" button 405. The OK button 404 and Cancel button 405 are presented together in what appears as a single graphical object 403 like a tongue but may functionally be considered two separate buttons. In the first presentation, the Cancel button 405 is in Bold text to indicate that selecting (pressing or hitting) the "Enter", "Return", or "↵" keys is equivalent to clicking the Cancel button 405. The difference between the Cancel button 405 in Bold and the OK button 404 in normal text may highlight to the user the additional properties of the Cancel button 405. Other font features (e.g., size, font, underlining, etc.), graphical elements (e.g., a dashed box around the word Cancel), and/or graphical effects (e.g., blinking) may also be used instead of or in addition to using Bold text to indicate that pressing the "Enter", "Return", or "↵" keys is equivalent to selecting a particular subordinate button.

The second presentation 410 is similar to the first 400 in that it includes a Create button 411, a Delete button 412, and subordinate OK 414 and Cancel 415 buttons presented together in single graphical object 413. However, the Delete button 412 in the second presentation 410 contains the text "Delete ?". This indicates an embodiment of the present invention where the Delete button 412 with the button text "Delete" once selected (e.g., clicked on) shows new button text "Delete ?"along with the subordinate buttons 414, 415. Adding the question mark "?"to the button text implies the popup window text such as "Do you really want to delete?"and that the combination of the three buttons (Delete button 412, OK subordinate button 414, and Cancel subordinate button 415) are an in-place popup confirmation request. According to this embodiment, the question mark is added to the button text while the subordinate buttons are present and a confirmation action by the user is being waited for. When the user selects a subordinate button 414, 415 (or in an alternative embodiment when a certain period of time passes or in another embodiment when the user clicks on another area of the GUI), the subordinate buttons disappear from the display and the initiating button 412 is returned to its original form. In this example, the "Delete ?"button text returns to the original "Delete" button text. In this example only a question mark was added to the button text, but the button text may be otherwise altered or changed as appropriate.

Figure 5:
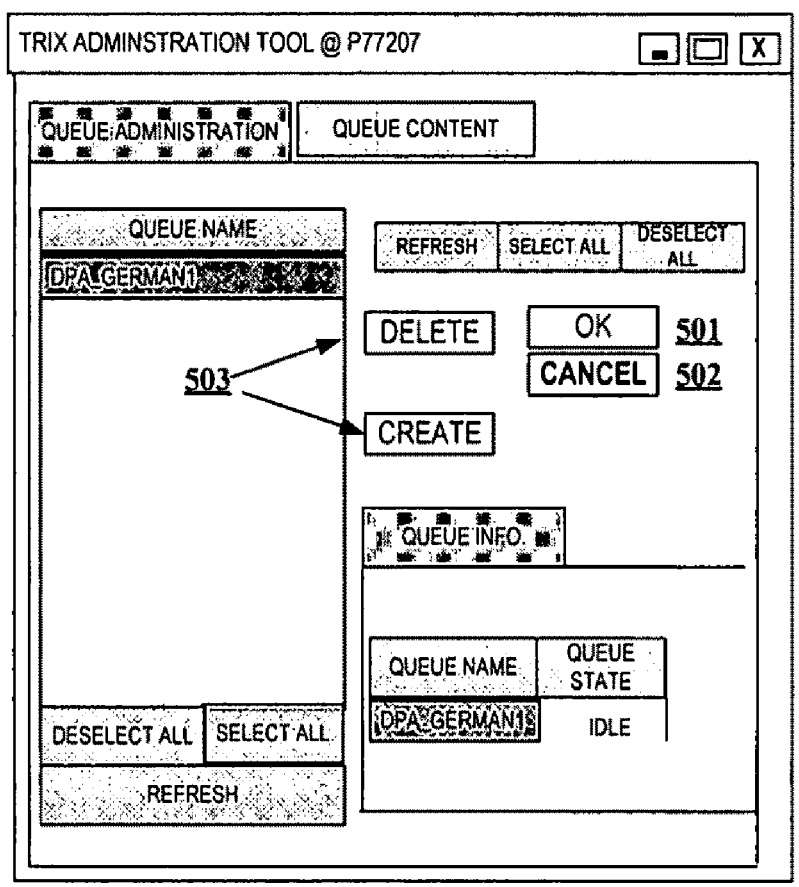
FIG. 5 is a diagram illustrating the implementation of subordinate buttons matching other buttons on the graphical user interface according to one embodiment of the present invention.

Both presentations 400, 410 of the subordinate buttons in FIG. 4 use a tongue-like object 403, 413 as also shown in FIG. 3. This representation of the subordinate buttons is only one example of they way subordinate buttons can be displayed. FIG. 5 is a diagram illustrating the implementation of subordinate buttons matching other buttons on the graphical user interface according to one embodiment of the present invention. In the example depicted in FIG. 5, the OK subordinate button 501 and the Cancel subordinate button 502 match the other buttons 503 on the graphical user interface 500 rather than using different buttons shapes and/or configurations. These subordinate buttons 501, 502 can still be implemented as discussed above using animation and/or effects as well as differing font features, graphical elements, and graphical effects, they just conform more closely to the button form of the GUI 500. For example, the subordinate buttons 501, 502 shown in FIG. 5 could still contain different colors such as green for the OK button 501 and red for the Cancel button 502.

Figure 6:
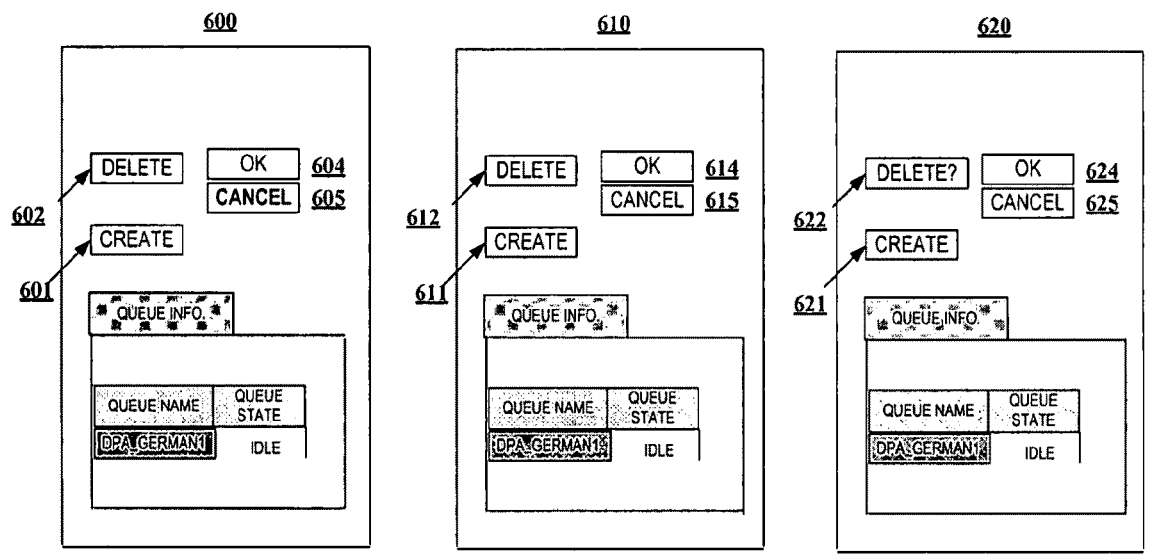
FIG. 6 is a diagram illustrating various presentations of subordinate buttons according to one embodiment of the present invention.

FIG. 6 is a diagram illustrating various presentations of subordinate buttons according to one embodiment of the present invention. The first presentation 600 shows a Create button 601, a Delete button 602, and two subordinate buttons: an OK button 604 and a Cancel button 605. As previously discussed, the Cancel button is in Bold to indicate that selecting (pressing or hitting) the "Enter", "Return", or "↵" keys is equivalent to clicking the Cancel button 605. Both subordinate buttons 604, 605 are shown as buttons matching the initiating button 602 in general appearance and the other buttons 601 on the graphical user interface. The second presentation 610 also shows a Create button 611, a Delete button 612, and two subordinate buttons: an OK button 614 and a Cancel button 615. Both subordinate buttons 614, 615 are shown as buttons matching the initiating Delete button 612 but neither button is differentiated (e.g., with Bold text) to show that it can be selected by pressing or hitting the "Enter", "Return", or "↵" keys. The third presentation 620 also shows a Create button 621, a Delete button 622, and two subordinate buttons: an OK button 624 and a Cancel button 625. The initiating Delete button 622 reflects one embodiment previously discussed where the initiating button text is altered during the display of the subordinate buttons 624, 625. In this example, the initiating Delete button 622 text is modified from the original "Delete" to "Delete?". Both subordinate buttons 624, 625 are shown as buttons matching the initiating Delete button 622 and neither button is differentiated as was the case in the first presentation 600. In addition to the embodiments of the subordinate button already discussed herein, a subordinate button may also appear in any type of special field such as, for example, radio fields, toggle fields, list boxes, etc. according to one embodiment of the present invention. In these special fields, the subordinate button may be an option in the field rather an actual button. These special fields may be displayed in any configuration including as drop drown fields from the initiating button in one embodiment of the present invention.

In an alternative embodiment of the present invention, the initiating button disappears when the subordinate buttons appears. When the user clicks on or otherwise selects the initiating button, the initiating button disappears from the display and the subordinate buttons appears. The subordinate buttons may appear in the same position as the initiating button thereby providing a further intuitive link between the subordinate buttons and the initiating buttons. The subordinate buttons may appear anywhere on the interface display but having them appear close to or at the location of the initiating button may further facilitate the operation for the user. The cursor may already be located at the position of the initiating button if the user clicks on that button. Having the subordinate buttons at or near this location facilitates the operation for the user by not only making apparent the link between the initiating and subordinate buttons but by also reducing any movement of the cursor necessary to click on the subordinate buttons. According to this embodiment when the user clicks on or otherwise selects one of the subordinate buttons, the subordinate buttons disappear and the initiating button reappears. In an embodiment where the GUI remains active after the subordinate buttons appear, clicking on another area of the interface (other than the subordinate buttons) or choosing an unrelated option may result in a termination of the initiating operation, the subordinate buttons disappearing, and the initiating button reappearing. As previously discussed for subordinate buttons, an animation and/or effect may be used when the initiating button disappears and reappears on the display. Also as previously discussed, an animation and/or effect used for the initiating button disappearing or appearing may be independent and does not necessarily require any other animation and/or effect.

Figure 7:
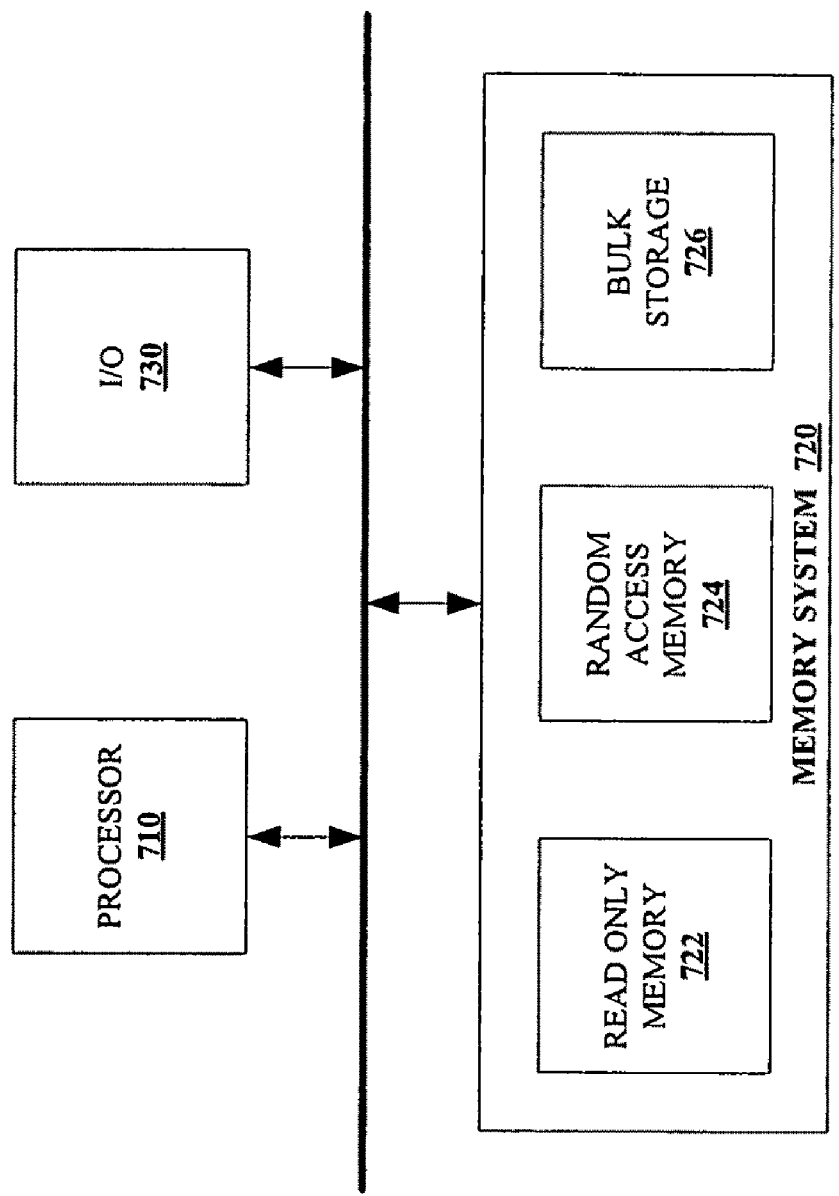
FIG. 7 is a block diagram illustrating the platform on which a graphical user interface and the enhanced context-sensitive buttons may operate according to one embodiment of the present invention.

FIG. 7 is a block diagram illustrating the platform on which a graphical user interface and the enhanced context-sensitive buttons may operate according to one embodiment of the present invention. Functionality of the foregoing embodiments may be provided on various computer platforms executing program instructions. One such platform 700 is illustrated in the simplified block diagram of FIG. 7. There, the platform 700 is shown as being populated by a processor 710, a memory system 720 and an input/output (I/O) unit 730. The processor 710 may be any of a plurality of conventional processing systems, including microprocessors, digital signal processors and field programmable logic arrays. In some applications, it may be advantageous to provide multiple processors (not shown) in the platform 700. The processor(s) 710 execute program instructions stored in the memory system. The memory system 720 may include any combination of conventional memory circuits, including electrical, magnetic or optical memory systems. As shown in FIG. 7, the memory system may include read only memories 722, random access memories 724 and bulk storage 726. The memory system not only stores the program instructions representing the various methods described herein but also can store the data items on which these methods operate. The I/O unit 730 would permit communication with external devices (not shown).

What is claimed is:

1. A method of displaying a first subordinate button and a second subordinate button in a graphical user interface of a software application viewable on a display device, comprising:
    displaying in a current window of the graphical user interface a stationary primary button for initiating a delete action on a highlighted data item;
    responsive to receiving an indication of a selection of the stationary primary button by a user in order to delete the highlighted data item,
    changing the current window by only adding the first subordinate button and the second subordinate button adjacent to the stationary primary button in the current window without obscuring the highlighted data item and the stationary primary button;
    responsive to receiving an indication of a selection of the first subordinate button by the user to cancel the delete action, removing the display of the first subordinate button and the second subordinate button;
    responsive to receiving an indication of a selection of the second subordinate button by the user to continue the delete action,
    performing the delete action on the highlighted data item, and
    removing the display of the first subordinate button and the second subordinate button, leaving the stationary primary button displayed in the current window.

2. The method of claim 1, wherein the first subordinate button and the second subordinate button are displayed with the stationary primary button to form a single graphic shape similar in shape to a tongue.

3. The method of claim 2, wherein the first subordinate button horizontally scrolls from the stationary primary button.

4. The method of claim 1, wherein the first subordinate button and the second subordinate button are animated to appear to scroll from underneath the stationary primary button, and the first subordinate button, the second subordinate button, and the stationary primary button are displayed substantially as one icon.

5. The method of claim 1, wherein the first subordinate button is displayed with animations and the second subordinate button is displayed without animation.

6. The method of claim 1, further comprising:
    responsive to receiving an indication of clicking on an area of the user interface other than the stationary primary button, the first subordinate button, or the second subordinate button, canceling the selection of the primary button.

7. The method of claim 1, wherein a displayed text description of the stationary primary button is changed to an interrogatory, and the first subordinate button and the second subordinate button form the answer to the interrogatory.

8. The method of claim 1, wherein the selection of the first subordinate button means to cancel the selection of the stationary primary button and the selection of the second subordinate button means to confirm the selection of the stationary primary button.

9. The method of claim 1, wherein the color of the first subordinate button indicates the meaning of selecting the first subordinate button is to cancel, and wherein the color of the second subordinate button indicates the meaning to confirm the selection of the stationary primary button.

10. The method of claim 9, wherein the color of the first subordinate button is red and the color of the second subordinate button is green.

11. The method of claim 10, wherein the shape of the first subordinate button indicates the meaning of selecting the subordinate button is to cancel, and wherein the shape of the second subordinate button indicates the meaning is to confirm the selection of the stationary primary button.

12. The method of claim 1, wherein the first subordinate button is highlighted to indicate that pressing a key on the keyboard will select the first subordinate button.

13. The method of claim 1, wherein displaying further comprises: animating the displaying of the first subordinate button so that the first subordinate button appears to come out from behind the stationary primary button.

14. The method according to claim 1, further comprising:
inactivating the graphical user interface other than the first subordinate button and the second subordinate button so that no action can be taken other than selecting one of the subordinate buttons;
reactivating the graphical user interface after at least one of the subordinate buttons is selected by a user action and a designated interval of time has passed; and
removing the subordinate button from the graphical user interface as a function of reactivating the graphical user interface.

15. The method of claim 1, wherein a size and a shape of the stationary primary button is maintained during the changing of the current window.

16. The method of claim 1, wherein the first subordinate button and the second subordinate button match the stationary primary button in shape and configuration.

17. A method of displaying a first subordinate button and a second subordinate button in a graphical user interface of a software application viewable on a display device, comprising:
displaying in a current window of the graphical user interface a stationary primary button for initiating an action on a highlighted data item;
responsive to receiving an indication of a selection of the stationary primary button by a user,
adding only to the current window a display of the first subordinate button and the second subordinate button adjacent to the primary button in the current window without obscuring the highlighted data item and the stationary primary button;
responsive to receiving an indication of a selection of the first subordinate button by the user to cancel the action, removing the display of the first subordinate button and the second subordinate button;
responsive to receiving an indication of a selection of the second subordinate button by the user to continue performance of the action,
performing the action on the displayed data item,
removing the display of the first subordinate button and the second subordinate button, leaving the stationary primary button displayed in the current window.

18. The method of claim 17, wherein the buttons can only be selected with a click of a mouse.

19. The method of claim 17, wherein the action to be preformed is a delete action.

20. A method of displaying a first subordinate button and a second subordinate button in a graphical user interface of a software application viewable on a display device, comprising:
displaying in a current window of the graphical user interface a stationary primary button for initiating a computer processing action on a highlighted data item;
responsive to receiving an indication of a selection of the stationary primary button by a user in order to perform a computer processing action to the highlighted data item,
changing the current window by only adding the first subordinate button and the second subordinate button adjacent to the stationary primary button in the current window without obscuring the highlighted data item and the stationary primary button, while maintaining a size and a shape of the stationary primary button, wherein the first subordinate button and the second subordinate button match the stationary primary button in shape and configuration;
responsive to receiving an indication of a selection of the first subordinate button by the user to cancel the computer processing action, removing the display of the first subordinate button and the second subordinate button;
responsive to receiving an indication of a selection of the second subordinate button by the user to continue the computer processing action,
performing the computer processing action on the highlighted data item, and
removing the display of the first subordinate button and the second subordinate button, leaving the stationary primary button display in the current window.

* * * * *